United States Patent
Harmon et al.

(10) Patent No.: US 12,336,529 B2
(45) Date of Patent: Jun. 24, 2025

(54) SYSTEM AND METHOD FOR AN AGRICULTURAL APPLICATOR

(71) Applicants: CNH Industrial America LLC, New Holland, PA (US); Kansas State University Research Foundation, Manhattan, KS (US)

(72) Inventors: Andrew W. Harmon, Sheboygan, WI (US); Ajay Sharda, Manhattan, KS (US); Jonathan Fabula, San Jose (PH)

(*) Notice: Subject to any disclaimer, the term of this patent is extended or adjusted under 35 U.S.C. 154(b) by 498 days.

(21) Appl. No.: 17/559,368

(22) Filed: Dec. 22, 2021

(65) Prior Publication Data
US 2023/0189785 A1 Jun. 22, 2023

(51) Int. Cl.
| | | |
|---|---|---|
| A01M 7/00 | (2006.01) | |
| B05B 1/20 | (2006.01) | |
| B05B 12/08 | (2006.01) | |
| B05B 12/12 | (2006.01) | |
| G05B 15/02 | (2006.01) | |

(52) U.S. Cl.
CPC ........ *A01M 7/0089* (2013.01); *A01M 7/0042* (2013.01); *B05B 1/20* (2013.01); *B05B 12/082* (2013.01); *B05B 12/085* (2013.01); *B05B 12/12* (2013.01); *G05B 15/02* (2013.01)

(58) Field of Classification Search
CPC ..... A01M 7/0089; A01M 7/0042; B05B 1/20; B05B 12/082; B05B 12/085; B05B 12/12; B05B 12/006; B05B 12/08; B05B 12/126; G05B 15/02
See application file for complete search history.

(56) References Cited

U.S. PATENT DOCUMENTS

| | | |
|---|---|---|
| 7,311,004 B2 | 12/2007 | Giles |
| 9,504,212 B2 | 11/2016 | Michael et al. |
| 9,635,848 B2 | 5/2017 | Needham et al. |
| 9,781,916 B2 | 10/2017 | Preheim et al. |
| 9,795,977 B2 | 10/2017 | Grimm et al. |

(Continued)

OTHER PUBLICATIONS

Clijmans et al. Sprayer Boom Motion, Part 1: Derivation of the Mathematical Model using Experimental System Identification Theory, 2000, Dept. of Agro-Engineering, 76, pp. 61-69. (Year: 2000).*

(Continued)

*Primary Examiner* — Chad G Erdman
(74) *Attorney, Agent, or Firm* — Rebecca Henkel; Rickard K. DeMille; Peter K. Zacharias

(57) ABSTRACT

A method for an agricultural application operation is provided herein. The method includes receiving a target application condition for an agricultural product to be exhausted from a nozzle assembly through an input device. The method also includes receiving an agricultural product flow condition and data related to boom movement from a sensing system. In addition, the method includes receiving a first duty cycle from a computing system. The method further includes determining a detected application condition based on the agricultural product flow condition, the data related to boom movement, and the first duty cycle with the computing system. Lastly, the method includes generating a duty cycle command based on a comparison of the target application condition to the detected application condition with the computing system.

15 Claims, 7 Drawing Sheets

(56) References Cited

U.S. PATENT DOCUMENTS

| | | |
|---|---|---|
| 10,786,826 B2 | 9/2020 | Sullivan et al. |
| 2015/0115058 A1 | 4/2015 | Wilger |
| 2016/0015020 A1* | 1/2016 | Needham ............ A01M 7/0089 239/159 |
| 2017/0348718 A1* | 12/2017 | Preheim ................ A01C 23/007 |
| 2018/0319500 A1* | 11/2018 | Grimm ..................... B05B 1/16 |
| 2019/0150358 A1 | 5/2019 | Grosse Prues et al. |
| 2019/0357520 A1* | 11/2019 | Redden .................. G05B 17/02 |
| 2020/0406281 A1 | 12/2020 | Funseth et al. |
| 2021/0102637 A1 | 4/2021 | Krosschell et al. |
| 2021/0127567 A1 | 5/2021 | Loukili et al. |
| 2021/0219538 A1* | 7/2021 | Krosschell .......... A01M 7/0089 |
| 2021/0252541 A1 | 8/2021 | Harmon et al. |
| 2021/0274772 A1 | 9/2021 | Long et al. |
| 2021/0289766 A1 | 9/2021 | Long et al. |
| 2021/0293256 A1 | 9/2021 | Long et al. |
| 2021/0299692 A1 | 9/2021 | Van De Woestyne |
| 2024/0099288 A1* | 3/2024 | Maurer ................... B05B 12/06 |

OTHER PUBLICATIONS

Hofman, "Spray Equipment and Calibration," NDSU Extension Service, AE73 (revised), Fargo, North Dakota, reviewed Mar. 2018, (44 pages) https://www.ag.ndsu.edu/publications/crops/spray-equipment-and-calibration.

* cited by examiner

SYSTEM AND METHOD FOR AN AGRICULTURAL APPLICATOR

FIELD

The present disclosure generally relates to agricultural implements and, more particularly, to systems and methods for monitoring a spray operation, such as by monitoring and/or altering a flow condition of an agricultural product during the spray operation.

BACKGROUND

Various types of work vehicles utilize applicators (e.g., sprayers, floaters, etc.) to deliver an agricultural product to a field of a field. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, various factors may affect a quality of application of the agricultural product to the field. Accordingly, an improved system and method for monitoring the quality of application of the agricultural product to the field would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a method for an agricultural application operation. The method includes receiving, through an input device, a target application condition for an agricultural product to be exhausted from a nozzle assembly. The method also includes receiving, from a sensing system, an agricultural product flow condition and data related to boom movement. In addition, the method includes receiving, from a computing system, a first duty cycle. The method further includes determining, with the computing system, a detected application condition based on the agricultural product flow condition, the data related to boom movement, and the first duty cycle. Lastly, the method includes generating, with the computing system, a duty cycle command based on a comparison of the target application condition to the detected application condition.

In some aspects, the present subject matter is directed to an agricultural system that includes a product application system including one or more nozzle assemblies. A sensing system is configured to capture data indicative of a condition of a spray operation. An input device is configured to receive a target application condition for an agricultural product to be exhausted from a nozzle assembly. A computing system is communicatively coupled to the product application system, the sensing system, and the input device. The computing system being configured to receive an agricultural product flow condition and data related to boom movement from the sensing system, receive a first duty cycle for the one or more nozzle assemblies, determine a detected application condition based on the agricultural product flow condition, the data related to boom movement, and the first duty cycle, and generate a duty cycle command based on a comparison of the target application condition to the detected application condition.

In some aspects, the present subject matter is directed to a method for an agricultural application operation. The method includes receiving, through an input device, a target application condition for an agricultural product to be exhausted from a nozzle assembly. The method also includes receiving, from a sensing system, an agricultural product flow condition and data related to boom movement. In addition, the method includes receiving, from a computing system, a first duty cycle. The method further includes determining a detected application condition based on the agricultural product flow condition, the data related to boom movement, and the first duty cycle. Lastly, the method includes generating, with the computing system, a duty cycle command, wherein the duty cycle command is a second duty cycle when the detected application condition deviates from a defined range of the target application condition.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
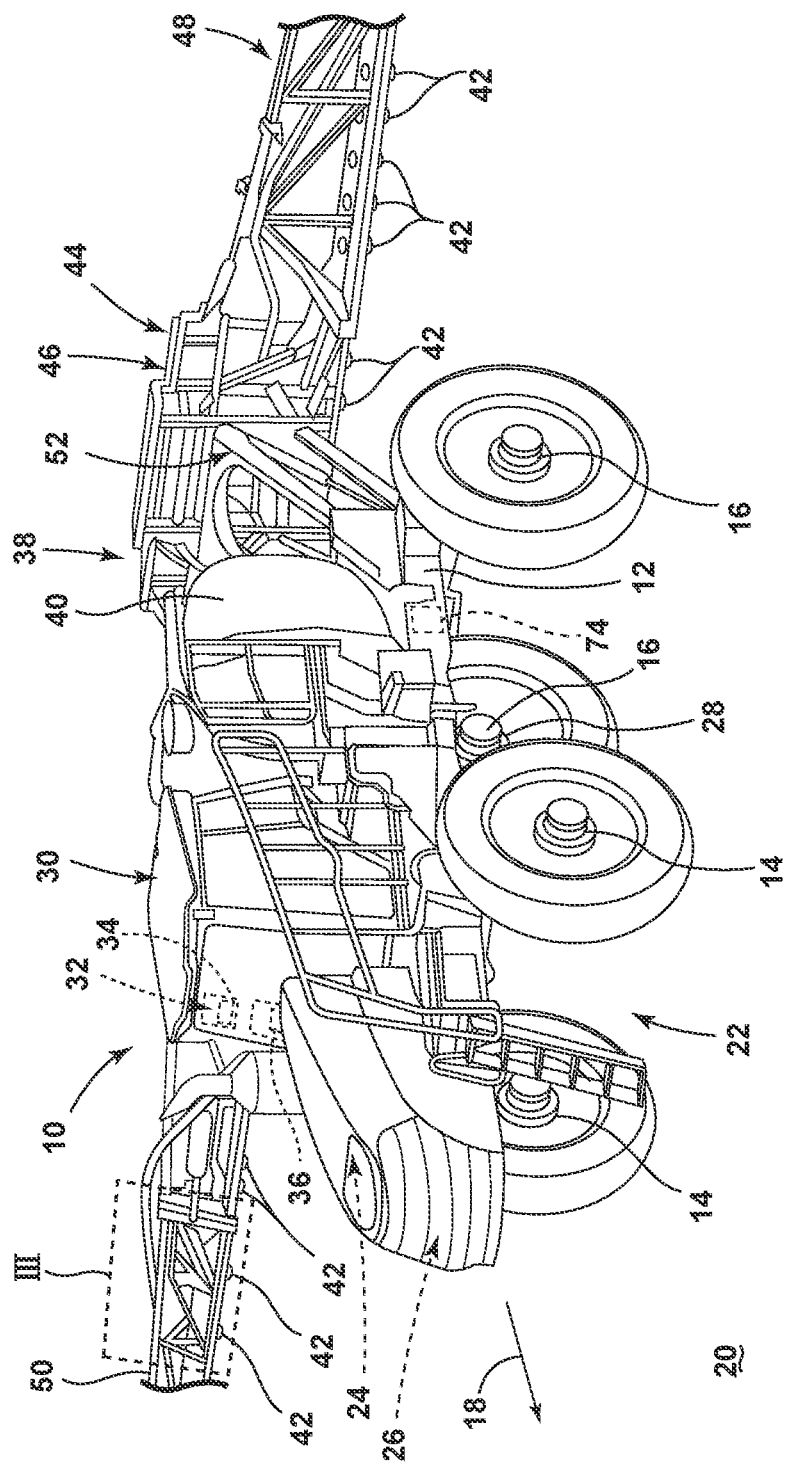
FIG. 1 illustrates a perspective view of an agricultural work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for various agricultural operations. In some instances, an agricultural system can include a product application system having one or more nozzle assemblies positioned along a boom assembly and configured to selectively dispense an agricultural product therefrom.

A sensing system can be operably coupled with the product application system. The sensing system may include one or more sensors, a weather station, and/or any other assembly, which may be installed on the vehicle and/or the boom assembly. In general, the sensing system may be configured to capture data indicative of one or more spray quality parameters that may affect a spray quality of application of the agricultural product to the field. The spray quality can be defined as a predefined application rate/range that estimates whether a spray operation has led to appropriate coverage of a field, or a portion of the field, by the agricultural product.

The one or more sensors may include a flow sensor configured to capture data indicative of a flow condition, such as a pressure and/or a velocity, of the agricultural product being supplied to the nozzle assemblies and/or within the nozzle assemblies. Additionally or alternatively, the one or more sensors may include a position sensor that is configured to capture data indicative of a position of the boom assembly relative to a chassis of a work vehicle. Based on the position of the boom assembly, a position of the one or more nozzle assemblies positioned along the boom assembly may also be calculated.

An input device is configured to receive a target application condition for an agricultural product to be exhausted from a nozzle assembly. The target application condition may include a target spray quality index, a target application rate range, a target pressure range, and/or any other operating condition.

A computing system can be communicatively coupled to the product application system, the sensing system, and the input device. The computing system may be being configured to receive an agricultural product flow condition and data related to boom movement from the sensing system. In addition, the computing system may be configured to receive a first duty cycle for the one or more nozzle assemblies. The computing system may determine a detected application condition based on the agricultural product flow condition, the data related to boom movement, and the first duty cycle. Further, the computing system may generate a duty cycle command based on a comparison of the target application condition to the detected application condition.

The computing system may also be configured to calculate a spray quality index based on data from the sensing system. The spray quality index represents a metric indicative of a spray operation coverage of a portion of a field. In some instances, the spray quality index may be used to determine whether the agricultural product was applied to various portions of the field within a defined range and/or misapplied to various portions of the field by deviating from the defined range.

Figure 2:
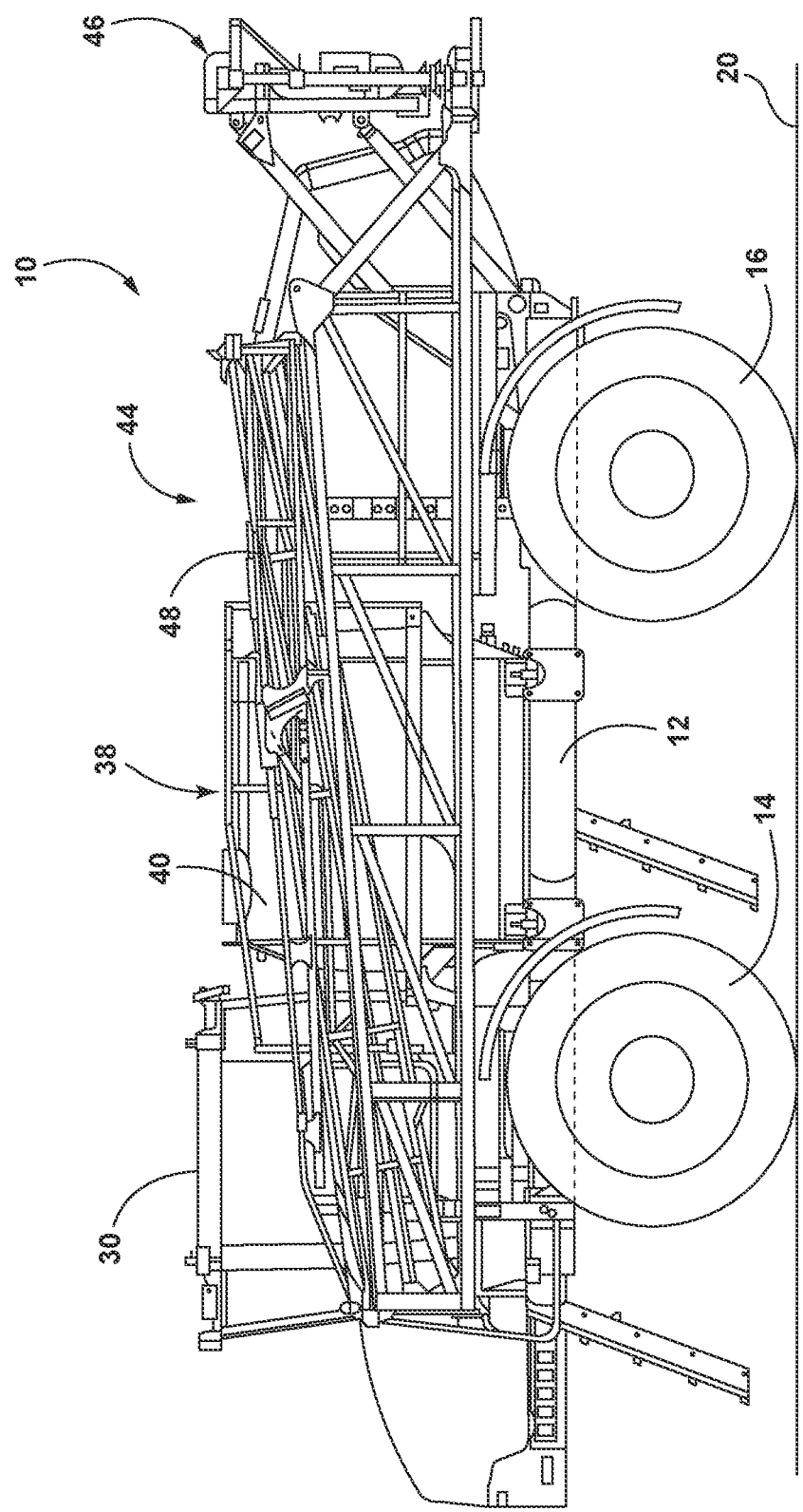
FIG. 2 illustrates a side view of the work vehicle in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural application operations, such as a tractor or other vehicle configured to haul or tow an application implement.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a field 20 and move the work vehicle 10 in a direction of travel (e.g., as indicated by arrow 18 in FIG. 1) across the field 20. In this regard, the work vehicle 10 may include a powertrain control system 22 that includes a power plant 24, such as an engine, a motor, or a hybrid engine-motor combination, a hydraulic propel or transmission system 26 configured to transmit power from the engine to the wheels 14, 16, and/or a brake system 28.

The chassis 12 may also support a cab 30, or any other form of user's station, for permitting the user to control the operation of the work vehicle 10. For instance, as shown in FIG. 1, the work vehicle 10 may include a user interface 32 having a display 34 for providing messages and/or alerts to the user and/or for allowing the user to interface with the vehicle's controller through one or more user input devices 36 (e.g., levers, pedals, control panels, buttons, and/or the like).

The chassis 12 may also support a boom assembly 42 mounted to the chassis 12. In addition, the chassis 12 may support a product application system 44 that includes one or more tanks 46, such as a rinse tank and/or a product tank. The product tank is generally configured to store or hold an agricultural product 38 (FIG. 4), such as a pesticide, a fungicide, a rodenticide, a nutrient, and/or the like. The agricultural product 38 (FIG. 4) is conveyed from the product tank through plumbing components, such as interconnected pieces of tubing, for release onto the underlying field 20 (e.g., plants and/or soil) through one or more nozzle assemblies 48 mounted on the boom assembly 42.

As shown in FIGS. 1 and 2, the boom assembly 42 can include a frame 50 that supports first and second boom arms 52, 54, which may be orientated in a cantilevered nature. The first and second boom arms 52, 54 are generally movable between an operative or unfolded position (FIG. 1) and an inoperative or folded position (FIG. 2). When distributing the product, the first and/or second boom arm 52, 54 extends laterally outward from the work vehicle 10 to cover swaths of the underlying field 20, as illustrated in FIG. 1. However, to facilitate transport, each boom arm 52, 54 of the boom assembly 42 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
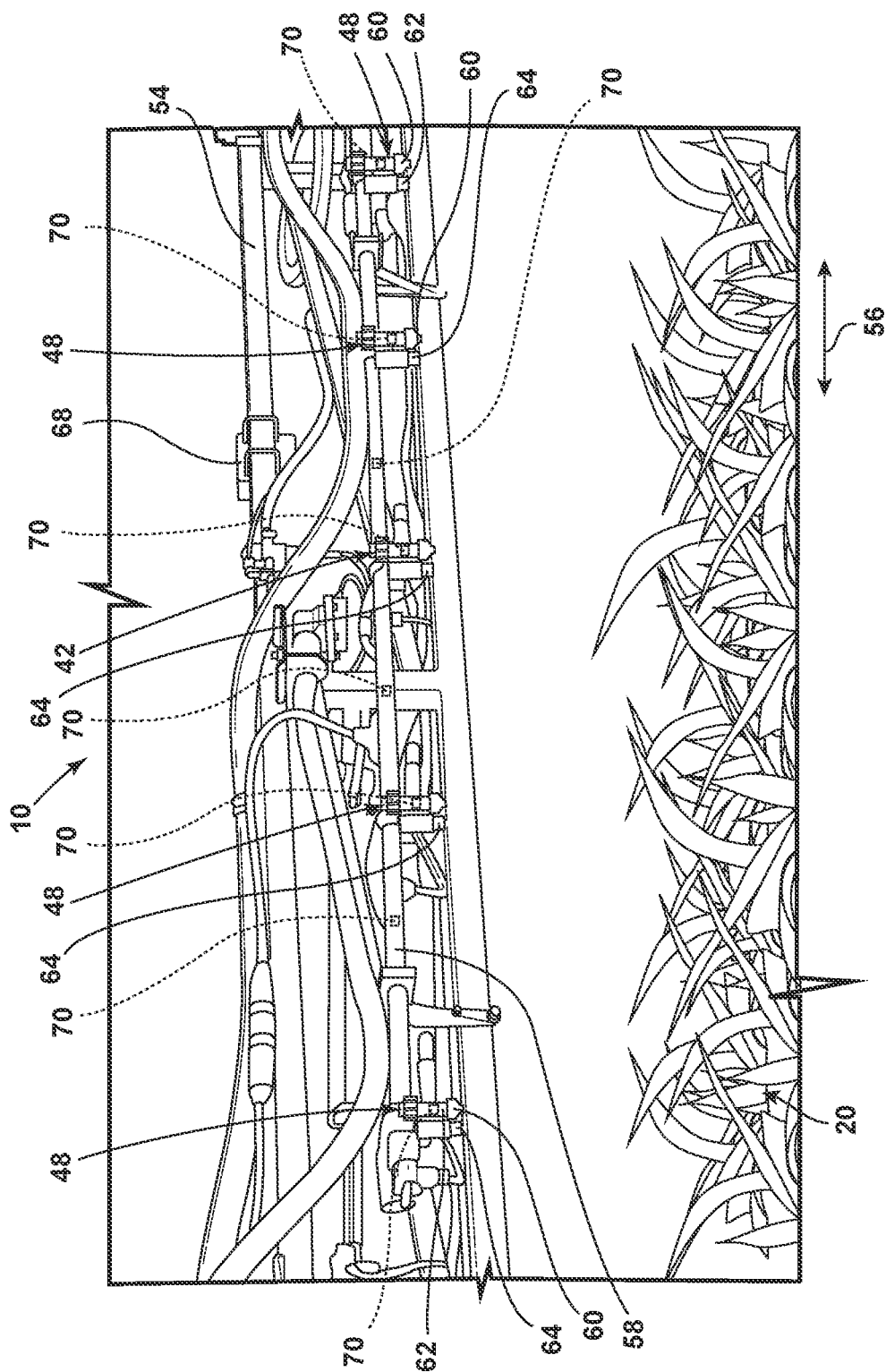
FIG. 3 is an enhanced view of section III of FIG. 1 illustrating a rear view of a portion of a boom assembly in accordance with aspects of the present subject matter.

Referring to FIG. 3, the boom assembly 42 may be configured to support a plurality of nozzle assemblies 48. Each nozzle assembly 48 may be configured to dispense an agricultural product 38 (FIG. 4) stored within the tank 46 (FIG. 1) onto the underlying field 20. In several embodiments, the nozzle assemblies 48 may be mounted on and/or operably coupled to the first boom arm 52, the second boom arm 54, and/or the frame 50 of the boom assembly 42, with the nozzle assemblies 48 being spaced apart from each other along a lateral direction 56. Furthermore, fluid conduits 58 may fluidly couple the nozzle assemblies 48 to the tank 46. In this respect, as the work vehicle 10 travels across the field 20 in the direction of travel 18 to perform a spray operation thereon, the agricultural product 38 (FIG. 4) moves from the tank 46 through the fluid conduit 58 to each of the nozzle assemblies 48. The nozzle assemblies 48 may, in turn, dispense or otherwise spray a fan of the agricultural product 38 (FIG. 4) onto the underlying field 20.

Referring still to FIG. 3, the nozzle assembly 48 may generally include a nozzle 60 and a valve 62. The nozzle 60 includes a nozzle body configured to receive the agricultural product 38 (FIG. 4) flowing through the fluid conduits 58 and a nozzle head mounted to and/or formed integrally with the nozzle body. For example, the nozzle 60 may be configured as a flat fan nozzle configured to dispense a flat fan of the agricultural product 38. However, in alternative embodiments, the nozzle 60 may be configured as any other suitable type of nozzles, such as dual pattern nozzles and/or hollow cone nozzles.

In some embodiments, the valve 62 can include restrictive orifices, regulators, and/or the like to regulate the flow of agricultural product 38 from the product application system 44 that is emitted from each nozzle 60. In various embodiments, the valve 62 may be configured as electronically controlled valves that are controlled by a Pulse Width Modulation (PWM) signal for altering the application rate of the agricultural product 38. For example, the valve 62 may be configured as a solenoid valve. In some examples, the nozzle assembly 48 may be configured as a direct-acting solenoid valve 62 configured to pulse with a frequency and duty cycle such that an orifice is active when the nozzle assembly 48 is open. The frequency may be sufficiently fast to diminish the dynamic effects of pulsing on the upstream system pressure and flow, therefore creating a controlled variable resistance to flow. It will be appreciated, however, that the nozzle assembly 48 shown and described in FIG. 3 is provided by way of example only. In other embodiments, the nozzle assembly 48 may be of any other suitable design capable of creating a controlled variable resistance to flow. For example, although the nozzle assembly 48 is depicted as a normally closed solenoid valve 62, in other embodiments, the nozzle assembly 48 may alternatively be a normally open solenoid valve 62.

In examples in which the valve 62 is an electronically controlled valve, an electric signal can be pulsed with a fixed period length. When the signal is high, i.e., when voltage is present, the pulse is in the ON position. The signal remains high (or ON) for a portion of the period length before switching low, i.e., to an OFF position, wherein no voltage is present. The relation of ON-time to period length is called a duty cycle and is measured in percent (%). For example, when applied to the nozzle assemblies 48, if the duty cycle is 50%, the resulting time-averaged resistance to flow will be double the total resistance to flow of an open nozzle assembly 48. It will be appreciated, however, that the period length described herein is by way of example only. In other embodiments, any other suitable period length may be provided.

With further reference to FIG. 3, during a spray operation, various spray quality parameters may affect a spray quality of application of the agricultural product 38 (FIG. 4), which can be computed into a spray quality index in which the spray quality index represents a metric indicative of a spray operation coverage of a portion of a field 20. In some instances, the spray quality index may be used to determine whether the agricultural product 38 (FIG. 4) was applied to various portions of the field 20 within a defined range and/or misapplied to various portions of the field 20 by deviating from the defined range. In several embodiments, the one or more spray quality parameters that may affect the spray quality can include at least one of an airflow at each nozzle assembly 48, a nozzle tip size and style, which agricultural product 38 (FIG. 4) is being applied, an incorrect agricultural product application rate, inclement weather as determined by meeting one or more criteria, an agricultural product application rate or pressure deviating from a predefined range, boom assembly movement (e.g., jounce) deviating from a movement range, a vehicle speed deviating from a predefined speed, a vehicle acceleration/deceleration deviating from a predefined range, a turning radius deviating from predefined criteria, and/or any other variable.

In accordance with aspects of the present subject matter, a sensing system 64 may include one or more sensors 66, a weather station 68, and/or any other assembly, which may be installed on the vehicle 10 and/or the boom assembly 42. In general, the sensing system 64 may be configured to capture data indicative of one or more spray quality parameters associated with the fans of the agricultural product 38 (FIG. 4) being dispensed by the nozzle assemblies 48. The spray quality parameter(s) may, in turn, be indicative of the quality of the spray operation, such as whether a target application rate of the agricultural product 38 (FIG. 4) is within a defined range. The sensors 66 may include position sensors, flow sensors, motion sensors (e.g., accelerometers, gyroscopes, etc.), image sensors (e.g., cameras, LIDAR devices, etc.), radar sensors, ultrasonic sensors, and/or the like, depending on the operating conditions/parameters being monitored. In addition, the weather station 68 may be configured to capture data indicative of a wind speed and direction at a defined position on the work vehicle 10. The mobile weather station 68 can contain any sensor that may be found on a stationary weather station 68 that monitors one or more weather criteria, such as temperature, wind speed, wind direction, relative humidity, barometric pressure, cloud cover, and trends thereof.

In several examples, the sensing system 64 may include one or more flow sensors 70. In general, the flow sensors 70 may be configured to capture data indicative of a flow condition, such as a pressure and/or a velocity, of the agricultural product 38 (FIG. 4) being supplied to the nozzle assemblies 48 and/or within the nozzle assemblies 48. In various examples, the one or more flow sensors 70 may be within the fluid conduits 58 operably coupling the nozzle assemblies 48 with the tank 46 and/or within the one or more nozzle assemblies 48. In several examples, the one or more flow sensors 70 may correspond to a diaphragm pressure sensor, a piston flow sensor, a strain gauge-based pressure sensor, an electromagnetic pressure sensor, a flow meter, and/or any other practicable sensor.

In operation, the one or more flow sensors 70 is configured to capture data indicative of a flow condition, such as a flow pressure or flow velocity, within the flow paths of the product application system 44. By detecting the flow conditions at various locations within the product application system 44, a pressure drop can be determined between two of the various locations (e.g., an upstream location and a downstream location). It should be noted, however, that velocities, instead of pressures, may be determined at similar locations to the pressures, and compared in a similar manner to determine whether the agricultural product 38 is being delivered to and/or exhausted from the nozzle assemblies 48 at a defined flow condition or whether a pressure drop is present within various portions of the product application system 44. In various examples, the product application system 44 may be manually or automatically operated to instruct a component of the product application system 44 to provide an increased pressure/velocity of the agricultural product 38 (FIG. 4) when the detected pressure being delivered to and/or exhausted from the nozzle assemblies 48 deviates from a defined pressure range and/or a defined velocity range.

Figure 4:
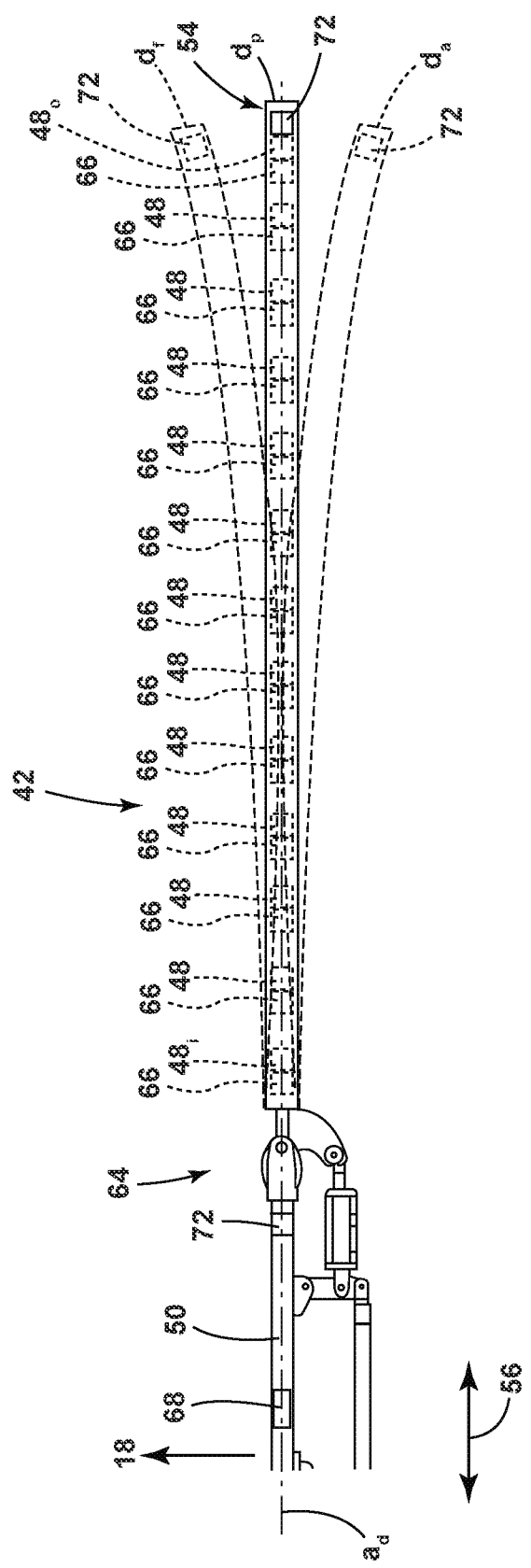
FIG. 4 is a top schematic view of a portion of a boom assembly in accordance with aspects of the present subject matter.

Referring to FIG. 4, during operation, various forces may be placed on the boom assembly 42 causing the boom assembly 42 and, consequently, the nozzle assemblies 48 positioned along the boom assembly 42, to be deflected or repositioned relative to the frame 50 and/or the work vehicle 10. For instance, a portion of the boom assembly 42 may be deflected from an assumed or a default position $d_p$ due to dynamic forces encountered when the work vehicle 10 is turned, accelerated, or decelerated. In addition, terrain variations and weather variances may also cause deflection of the boom assembly 42. Further, a portion of the boom assembly 42 may come in contact with an object, thereby leading to deflection of the boom assembly 42.

In embodiments that utilize a boom arm 54 that is supported by the frame 50 in a cantilevered orientation (or any other non-uniform orientation), such as the one illustrated in FIG. 4, an outer nozzle assembly $48_o$ will have a greater deflection magnitude from its default position $d_p$ than an inner nozzle assembly $48_i$. Once the deflective force is overcome and/or no longer present, the boom arm 54 will move back towards its default position $d_p$. In some embodiments, the movement of the boom arm 54 may generally occur as harmonic oscillations across the default axis $a_d$ such that the boom arm 54 may move from a position at least partially aft of the default axis $a_d$ to the default position $d_p$ and then to a position at least partially fore of the default position $d_p$ and so on. During the oscillations, an acceleration or speed of an inner nozzle assembly $48_i$ may be less than the outer nozzle assembly $48_o$ due to the varied deflection magnitudes along the boom arm 54. In addition, once the boom assembly 42 is deflected, a path of movement of the inner nozzle assembly $48_i$ may be non-parallel to a path of movement of the outer nozzle assembly $48_o$.

In some embodiments, a boom speed and/or boom acceleration of the boom arm 54 may be calculated based on the detected and/or calculated position of various portions of the boom arm 54 based on data from a position sensor 72 within the sensing system 64 relative to a default boom layout at known periods to define a boom deflection model. The boom deflection model may map a deflection of each nozzle assembly 48 from a default axis $a_d$, a nozzle assembly speed or acceleration, and/or a path of movement of each nozzle assembly 48 relative to the frame 50. In various embodiments, the boom deflection model may be determined through various geometric equations, lookup tables (LUTs), and/or any other method to determine a position, a speed, and/or an acceleration of each nozzle assembly 48. In turn, the boom deflection model and the speed of the vehicle may be used to determine a speed of each nozzle assembly 48. In some instances, a computing system (FIG. 5) may determine a detected application condition based on the agricultural product flow condition, the data related to boom movement, and the first duty cycle. Further, the computing system may generate a duty cycle command based on a comparison of the target application condition to the detected application condition. Additionally or alternatively, operating parameters of the work vehicle 10 and/or one or more nozzle assemblies 48 may be otherwise altered relative to one another based on the agricultural product flow condition, the data related to boom movement, and the first duty cycle of each nozzle assembly 48 such that the computing system provide unique duty cycle commands to each nozzle assembly 48 and/or a group of nozzle assemblies 48.

Figure 5:
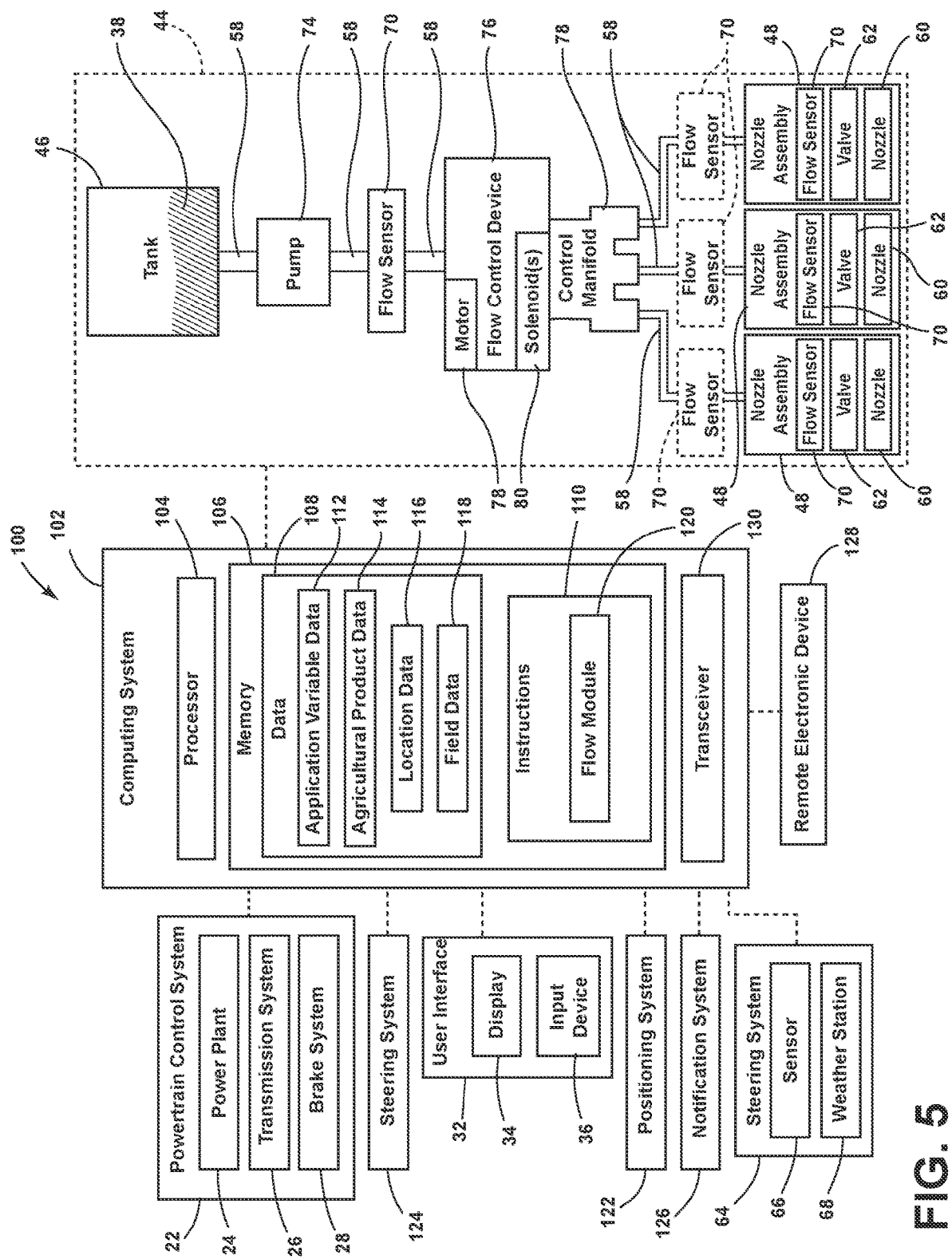
FIG. 5 illustrates a block diagram of components of the agricultural applicator system in accordance with aspects of the present subject matter.

Referring now to FIG. 5, a schematic view of a system 100 for operating the work vehicle 10 is illustrated in accordance with aspects of the present subject matter. In general, the system 100 will be described with reference to the work vehicle 10 described above with reference to FIGS. 1-4. However, it should be appreciated by those of ordinary skill in the art that the disclosed system 100 may generally be utilized with agricultural machines having any other suitable machine configuration. Additionally, it should be appreciated that, for purposes of illustration, communicative links, or electrical couplings of the system 100 shown in FIG. 4 are indicated by dashed lines.

As shown in FIG. 5, the system 100 may include a computing system 102 operably coupled with the product application system 44 to dispense an agricultural product 38 from the product application system 44 to the field 20 (FIG. 1) through one or more nozzle assemblies 48 that may be positioned at least partially along the boom assembly 42 (FIG. 1).

The product application system 44 may include the one or more tanks 46 that are configured to retain an agricultural product 38. A fluid conduit 58 is fluidly coupled with the tank 46 and a pump 74. In several embodiments, the pump 74 may be a diaphragm, a piston, a scroll, or another pumping assembly. The product application system 44 may also include a flow control device 76 and a flow manifold 78. The flow control device 76 receives the agricultural product 38 from the tank 46 and is configured to control (e.g., meter) the agricultural product 38 flow into the flow manifold 78. The flow manifold 78 is configured to direct the agricultural product 38 into conduits 58 respectively coupled to the nozzle assemblies 48.

The one or more flow sensors 70 of the sensing system 64 may be positioned within the product application system 44. For example, one or more flow sensors 70 may be positioned between the tank 46 and the flow control device 76, between the flow manifold 78 and the nozzle assemblies 48, and/or within the nozzle assemblies 48. As provided herein, the one or more flow sensors 70 are configured to capture data indicative of a flow condition within the product application system 44. In various examples, the flow conditions can include at least one of a pressure and/or a velocity of the agricultural product 38 within the product application system 44.

The computing system 102 may be electrically coupled to the pump 74, the flow control device 76, the flow manifold 78, and/or the one or more flow sensors 70 of the product application system 44. The computing system 102 may be configured to adjust the flow control device 76 based at least in part on feedback from the flow sensors 70 and a desired flow rate for the nozzle assemblies 48. In some embodiments, a motor 80 is configured to adjust (e.g., open, close) the flow control device 76 to change the agricultural product 38 flow rate through the product application system 44, and/or to direct the agricultural product 38 to certain nozzle assemblies 48. One or more solenoids 82 may be configured to control the agricultural product 38 flow through the flow control device 76 and the flow manifold 78. The solenoids 82 may be used to direct the agricultural product 38 to certain nozzle assemblies 48. In addition, a position of a solenoid 82 may be altered to change a volume of the agricultural product 38 provided to a nozzle assembly 48 from a first volume to a second volume. In various examples, the first volume may be greater than or less than the second volume.

In general, the computing system 102 may comprise any suitable processor-based device, such as a computing device or any suitable combination of computing devices. Thus, in several embodiments, the computing system 102 may include one or more processors 104 and associated memory 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the computing system 102 may generally comprise memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor 104, including data 108 that can be retrieved, manipulated, created, and/or stored by the processor 104 and instructions 110 that can be executed by the processor 104, when implemented by the processor 104, configure the computing system 102 to perform various computer-implemented functions, such as one or more aspects of the image processing algorithms and/or related methods described herein. In addition, the computing system 102 may also include various other suitable components, such as a communications circuit or module, one or more input/output channels, a data/control bus, and/or the like.

In various embodiments, the computing system 102 may correspond to an existing controller of the agricultural work vehicle 10, or the computing system 102 may correspond to a separate processing device. For instance, in some embodiments, the computing system 102 may form all or part of a separate plug-in module or computing device that is installed relative to the work vehicle 10 or boom assembly 42 (FIG. 1) to allow for the disclosed system 100 and method to be implemented without requiring additional software to be uploaded onto existing control devices of the work vehicle 10 or the boom assembly 42 (FIG. 1). Further, the various functions of the computing system 102 may be performed by a single processor-based device or may be distributed across any number of processor-based devices, in which instance such devices may be considered to form part of the computing system 102. For instance, the functions of the computing system 102 may be distributed across multiple application-specific controllers, such as a pump controller, individual nozzle controllers, and/or the like.

In several embodiments, the data 108 may be information received and/or generated by the computing system 102 that is stored in one or more databases. For instance, as shown in FIG. 5, the memory 106 may include an application variable database 112 for storing application variable data that is received from the various components of the system 100, such as the sensing system 64. Moreover, in addition to initial or raw sensor data received from the various components, final or post-processing application variable data (as well as any intermediate application variable data created during data processing) may also be stored within the application variable database 112.

In the example illustrated in FIG. 5, at least a portion of the application variable data provided to the memory 106 may be received from the product application system 44. For example, a flow condition within the product application system 44 and/or within one or more nozzle assemblies 48 of the product application system 44 may be stored within the application variable database 112. Additionally or alternatively, at least a portion of the application variable data provided to the memory 106 may be received from the sensing system 64. For example, a position of the nozzle assemblies 48 may also be stored within the application variable database 112.

In various embodiments, the memory 106 may also include an agricultural product database 114 that stores product information. The product information may include various information regarding the conditions and rates of application for an individual product that is to be applied to the field 20. In some instances, the product information may be preloaded or sent to the vehicle 10 via wired or wireless communication therewith. Additionally or alternatively, the product information may be manually inputted into the database. In some embodiments, based on the selected product information, a different spray quality index, acceptable application rate range, acceptable application droplet size range, acceptable application pressure range, and/or any other characteristic may be selected.

Additionally, in several embodiments, the memory 106 may also include a location database 116 storing location data of the work vehicle 10 and/or the boom assembly 42 (FIG. 1). For example, in some embodiments, the positioning system 122 may be configured to determine the location of the work vehicle 10 and/or the boom assembly 42 (FIG. 1) by using a satellite navigation positioning system 122 (e.g. a GPS system, a Galileo positioning system, the Global Navigation satellite system (GLONASS), the BeiDou Satellite Navigation and Positioning system, a dead reckoning device, and/or the like). In such embodiments, the location determined by the positioning system 122 may be transmitted to the computing system 102 (e.g., in the form location coordinates) and subsequently stored within the location database 116 for subsequent processing and/or analysis.

In several embodiments, the location data stored within the location database 116 may also be correlated to the application variable data stored within the application variable database 112. For instance, in some embodiments, the location coordinates derived from the positioning system 122 and the application variable data captured by the sensing system 64 may both be time-stamped. In such embodiments, the time-stamped data may allow each individual set of data captured by the sensing system 64 to be matched or correlated to a corresponding set of location coordinates received from the positioning system 122, thereby allowing the data to be associated with a location of the field 20.

Additionally, in some embodiments, such as the one shown in FIG. 5, the memory 106 may include a field database 118 for storing information related to the field 20, such as application map data. In such embodiments, by matching each set of application variable data captured by the sensing system 64 to a corresponding set of location coordinates, the computing system 102 may be configured to generate or update a corresponding application map associated with the field 20, which may then be stored within the field database 118 for subsequent processing and/or analysis. For example, the application variable data captured by the sensing system 64 and/or the positioning system 122 may be mapped or otherwise correlated to the corresponding locations within the application map. Alternatively, based on the location data and the associated sensing system 64 data, the computing system 102 may be configured to generate an application map that includes the geo-located application variable associated therewith.

With further reference to FIG. 5, in several embodiments, the instructions 110 stored within the memory 106 of the computing system 102 may be executed by the processor 104 to implement a flow module 120. The flow module 120 may utilize any data processing techniques or algorithms, such as by applying corrections or adjustments to the data, filtering the data to remove outliers, implementing subroutines or intermediate calculations, and/or by performing any other desired data processing-related techniques or algorithms. In general, the flow module 120 may be configured to determine one or more flow conditions and alter the one or more conditions based on the movement of the nozzle assemblies 48 and/or a deviation of the spray quality index from a defined range. In various examples, the flow conditions can include at least one of a pressure and/or a velocity of the agricultural product 38 (FIG. 4) within the product application system 44. For instance, in some examples, a duty cycle of one or more nozzle assemblies 48 may be adjusted and/or altered from another nozzle assembly 48 based on movement of the nozzle assembly 48. Additionally or alternatively, the flow module 120 may be configured to analyze the data to determine a spray quality index for various sections of the field 20 and/or whether the spray quality index is within predefined ranges. In various examples, the application variables may be used to calculate an overall spray quality index.

In some instances, an initial or first duty cycle may be provided for the operation of each nozzle assembly 48. The first duty cycle may be based on target application conditions, such as a target spray quality index, a target application rate range, a target pressure range, and/or any other operating conditions. During operation, the nozzle assemblies 48 may experience various factors that cause the application variables to vary from default or assumed application variables causing an application condition to also be varied from the target application condition. For example, the application rate may be generally based on an agricultural product flow condition, the data related to boom movement, and the first duty cycle. In operation, when the boom deviates from its default position causing the nozzle assemblies 48 to move at various speeds relative to one another, the application rates of the agricultural product 38 (FIG. 4) to the portions of the field 20 associated with the various nozzle assemblies 48 also vary relative to one another. As such, the flow module 120 may be configured to calculate a duty cycle error that defines a difference between the duty cycle that is needed for each respective nozzle assembly 48 to achieve the target application condition and the default target application condition. In turn, the computing system 102 may generate one or more outputs based on the duty cycle error. For example, the computing system 102 may update the duty cycle of each nozzle assembly 48 from the first duty cycle to a second duty cycle based on the duty cycle error to achieve the target operating conditions.

Additionally, or alternatively, in some examples, the flow module 120 may alter the operation of the product application system 44 to pause or otherwise change the application of the agricultural product 38 (FIG. 4) in response to determining that the application has deviated from the spray quality index by a defined amount, the duty cycle cannot be altered to obtain a desired target application condition, and/or for any other reason. In various examples, the system 100 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 102 and may be used to generate a predictive evaluation of the alterations to the product application system 44. For instance, the flow module 120 may alter the product application system 44. In turn, the system 100 may monitor any changes to the actual application condition and/or the spray quality index. Each change may be fed back into the flow module 120 for further alterations to the product application system 44.

In addition, various other components may be adjusted by the flow module 120 in response to one or more application variables deviating from a defined range or threshold. For example, the computing system 102 may also adjust or alter the powertrain control system 22, a steering system 124, and/or the vehicle suspension when the spray quality index deviates from a defined range.

In some embodiments, the flow module 120 may further provide notifications and/or instructions to the user interface 32, a vehicle notification system 126, and/or a remote electronic device 128. In some examples, the display 34 of the user interface 32 may be capable of displaying information related to the spray quality index and/or a pressure at one or more nozzle assemblies 48. The vehicle notification system 126 may prompt visual, auditory, and tactile notifications and/or warnings when one or more flow conditions of the product application system 44 deviate from a defined range and/or one or more functions of the vehicle 10 or the boom assembly 42 (FIG. 1) is altered by the computing system 102. For instance, vehicle brake lights and/or vehicle emergency flashers may provide a visual alert. A vehicle horn and/or speaker may provide an audible alert. A haptic device integrated into the cab 30 and/or any other location may provide a tactile alert. Additionally, the computing system 102 and/or the vehicle notification system 126 may communicate with the user interface 32 of the vehicle 10. In addition to providing the notification to the user, the computing system 102 may additionally store the location of the vehicle 10 at the time of the notification.

Further, the computing system 102 may communicate via wired and/or wireless communication with one or more remote electronic devices 128 through a transceiver 130. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 128 may also include a display for displaying information to a user. For instance, the electronic device 128 may display one or more user interfaces and may be capable of receiving remote user inputs to set a predefined threshold for any of the application variables and/or to input any other information, such as the agricultural product 38 (FIG. 4) to be used in a spray operation. In addition, the electronic device 128 may provide feedback information, such as visual, audible, and tactile alerts, and/or allow the user to alter or adjust one or more components of the vehicle 10 or the boom assembly 42 (FIG. 1) through the usage of the remote electronic device 128. It will be appreciated that the electronic device 128 may be any one of a variety of computing devices and may include a processor and memory. For example, the electronic device 128 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Although the various control functions and/or actions are generally described herein as being executed by the computing system 102, one or more of such control functions/actions (or portions thereof) may be executed by a separate computing system 102 or may be distributed across two or more computing systems (including, for example, the computing system 102 and a separate computing system). For instance, in some embodiments, the computing system 102 may be configured to acquire data from the sensing system 64 for subsequent processing and/or analysis by a separate computing system (e.g., a computing system associated with a remote server).

Figure 6:
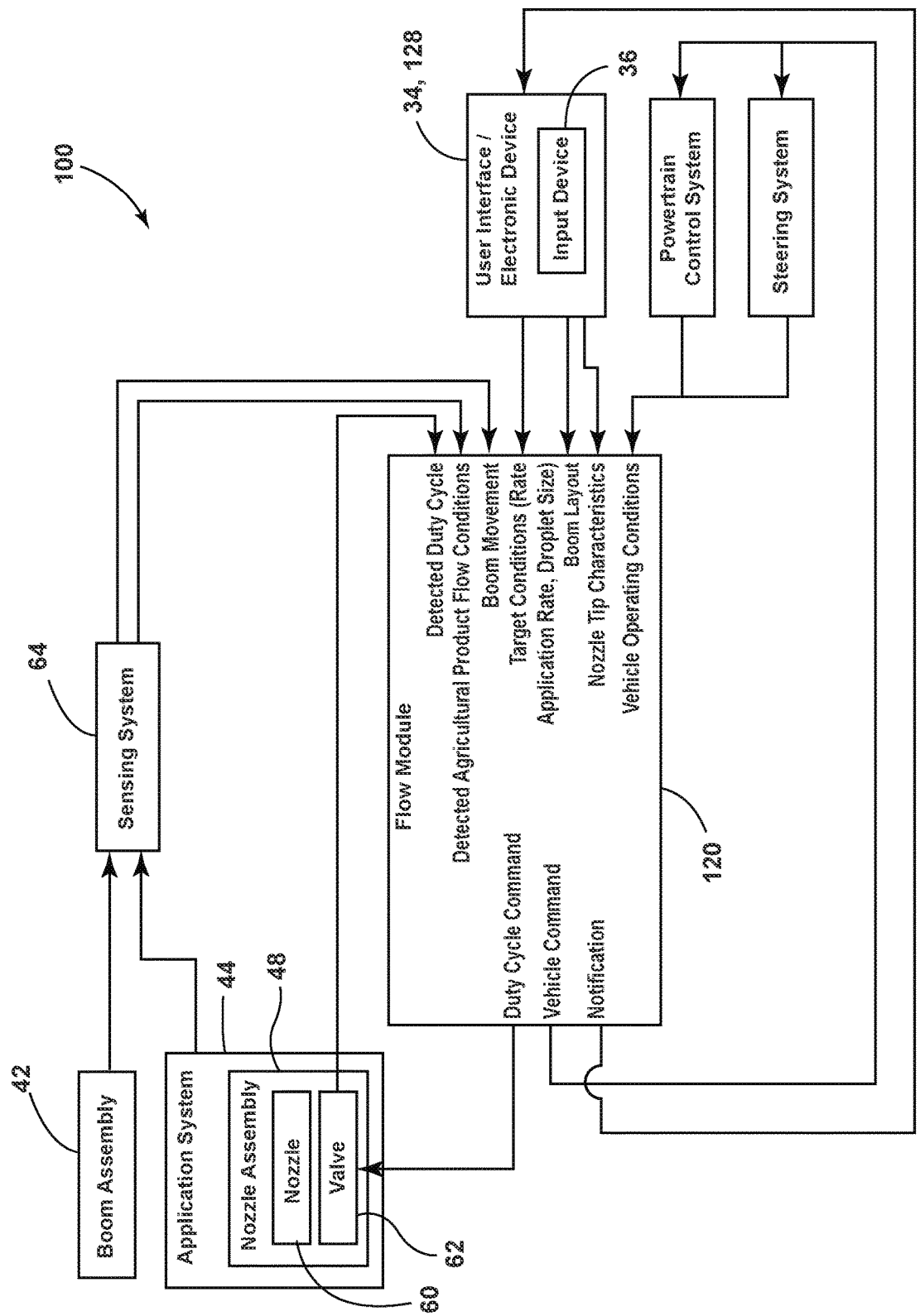
FIG. 6 is a schematic block diagram illustrating portions of the computing system operably coupled with the agricultural applicator system in accordance with aspects of the present subject matter.

Referring now to FIG. 6, various components of the system 100 are illustrated in accordance with various aspects of the present disclosure. As shown, the flow module 120 may receive data from various components of the system 100 and, in turn, determine a duty cycle command for the valve 62 associated with each nozzle assembly 48. It will be appreciated that additional data may be provided from the illustrated components and/or other components of the system 100 that are utilized for determining a duty cycle command. As such, the inputs for the flow module 120 and/or the outputs for the flow module 120 may be varied from the example illustrated in FIG. 6.

As illustrated, the flow module 120 may receive data indicative of the boom layout from an input device 36. The boom layout may provide information related to one or more characteristics of the boom and/or the positions of the one or more nozzle assemblies 48 along the boom assembly 42 (FIG. 1) relative to a reference point. In some instances, the boom deflection model may use the boom layout in addition to various geometric equations, lookup tables (LUTs), and/or any other method to determine a position, a speed, and/or an acceleration of each nozzle assembly 48 during operation of the work vehicle 10. The user interface 32 may also provide a target application rate range, a target pressure range, a target droplet size range, and/or one or more nozzle characteristics to the flow module 120.

The powertrain control system 22 and/or the steering system 124 may provide one or more work vehicle operating conditions. For example, the one or more operating conditions provided by the powertrain control system 22 may include a vehicle speed and/or any other information. Additionally or alternatively, the one or more operating conditions provided by the steering system 124 may include a vehicle direction and/or any other information.

The sensing system 64 may provide data related to a detected flow conditions, such as a flow pressure or flow velocity, of the application system 44. In addition, the sensing system 64 may provide data related to boom movement of the boom assembly 42 (FIG. 1). In some embodiments, a boom deflection model may be determined based on the data related to boom movement of the boom assembly 42 (FIG. 1) at known periods. The boom deflection model may map a deflection of each nozzle assembly 48 from a default axis, a nozzle assembly speed or acceleration, and/or a path of movement of each nozzle assembly 48 relative to the frame 50. In turn, the boom deflection model and the speed of the vehicle may be used to determine a speed of each nozzle assembly 48.

In addition, a duty cycle of each valve 62 may be detected based on data provided from the respective valve 62 and/or assumed to be equal to a duty cycle command provided by the flow module 120 to the respective valve 62. Additionally or alternatively, data from the sensing system 64 may also be used to determine and/or confirm that the valve 62 is operating at or close to a commanded duty cycle.

As provided herein, a first default duty cycle may be provided for the operation of each nozzle assembly 48. The first duty cycle may be based on default target application conditions, such as a target spray quality index, a target application rate range, a target pressure range, and/or any other operating conditions. As provided herein, during operation, the nozzle assemblies 48 may experience various factors that cause the application variables to vary from default or assumed application variables causing an application condition to also be varied from the target application condition. As such, the flow module 120 may be configured to calculate a duty cycle error that defines a difference between a second duty cycle that is needed for each respective nozzle assembly 48 to achieve the target application condition and the detected application condition with each nozzle assembly 48 operating at a respective first duty cycle. In turn, the flow module 120 may generate one or more outputs based on the duty cycle error. For example, the output may be a duty cycle command that alters the valve 62 from the first duty cycle to the second duty cycle based on the duty cycle error to achieve the target operating conditions.

As illustrated in FIG. 6, the system 100 provided herein may provide closed-loop control for monitoring and/or adjusting a duty cycle of one or more nozzle assemblies 48 based on the received inputs and/or the received data. Additionally, in some instances, if a duty cycle required to obtain a target application condition is greater than 100%, the flow module 120 may provide an output in the form of instructions to slow the work vehicle 10 and/or in the form of instructions that automatically adjust a speed of the work vehicle 10.

Additionally or alternatively, the system 100 may be configured to alter the duty cycle of one or more valves 62 to affect a spray quality index. In such instances, if a duty cycle error is present and the spray quality index deviates from the defined range, the flow module 120 may provide a command to adjust the duty cycle of one or more valves 62. Alternatively, if a duty cycle error is present and the spray quality index is within the defined range, the flow module 120 may provide a command to maintain the duty cycle of one or more valves 62.

Figure 7:
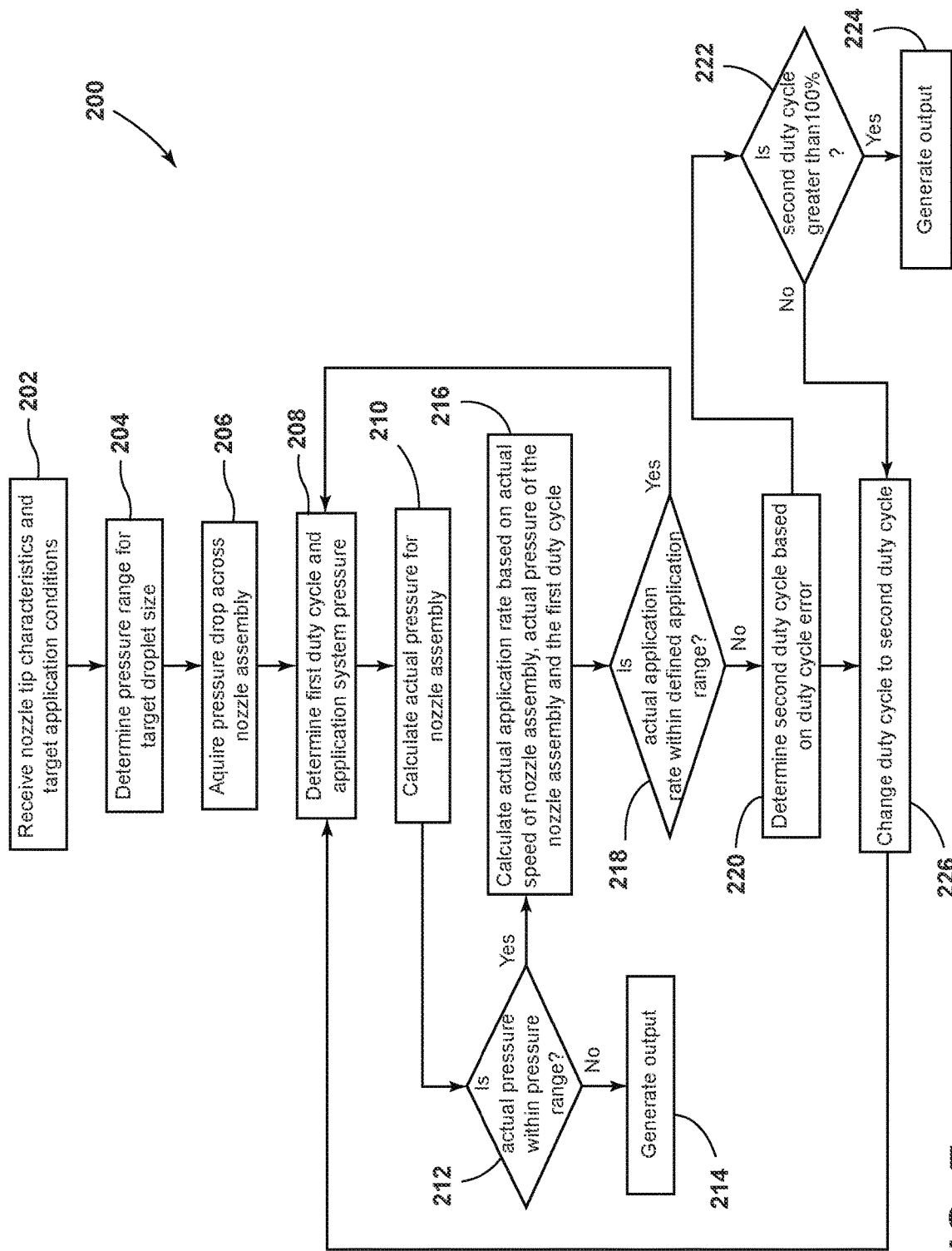
FIG. 7 illustrates a flow diagram of a method for an agricultural application operation in accordance with aspects of the present subject matter.

Referring now to FIG. 7, a flow diagram of some embodiments of a method 200 for an agricultural application operation is illustrated in accordance with aspects of the present subject matter. In general, the method 200 will be described herein with reference to one or more nozzle assembly 48 implemented on the work vehicle 10 and the system 100 described above with reference to FIGS. 1-6. However, the disclosed method 200 may generally be utilized with any suitable agricultural work vehicle 10 and/or may be utilized in connection with a system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 can include receiving nozzle tip characteristics, such as a nozzle spray pattern, and one or more target application conditions, such as a target spray quality index, a target application rate range, a target pressure range, and/or any other operating conditions.

At (204), the method 200 can include determining a pressure range for a target droplet size. In various instances, the pressure range may be inputted through an input device and/or calculated based on data received by the computing system.

At (206), the method 200 can include acquiring a pressure drop across a nozzle assembly. The pressure drop can be determined between two of the various locations (e.g., an upstream location and a downstream location). It should be noted, however, that velocities, instead of pressures, may be determined at similar locations to the pressures, and compared in a similar manner to determine whether the agricultural product is being delivered to and/or exhausted from the nozzle assemblies at a defined flow condition or whether a pressure drop is present within various portions of the product application system.

At (208), the method 200 can include determining a first duty cycle and the application system pressure. The first duty cycle may be based on target application conditions, such as a target spray quality index, a target application rate range, a target pressure range, and/or any other operating conditions. The application system pressure may be a pressure at any position between the tank and the nozzle assembly.

At (210), the method 200 can include calculating an actual pressure for the nozzle assembly. In various instances, the actual pressure for the nozzle assembly may be equal to the pressure of the application system minus the press drop.

At (212), the method 200 can include determining where the actual pressure is within the defined pressure range. If the pressure deviates from the defined pressure range, the droplet size may be incorrect. In such instances, at (214), the method 200 can include generating an output. The output may be in the form of instructions for a change in one or more components of the application system and/or a notification provided to the user interface or electronic device.

If the pressure is within the defined pressure range, the droplet size of the agricultural product may be correct. In such instances, at (216), the method 200 can include calculating an actual application rate based on an actual speed of the nozzle assembly, the actual pressure of the nozzle assembly, and the first duty cycle. In various instances, various conditions may cause the nozzle assembly to move at a speed that is varied from other nozzle assemblies and/or the chassis of the work vehicle. As such, the application rate may change to the variance in conditions.

At (218), the method can include determining whether the actual application rate is within a defined application rate. If the actual application rate is within the defined application range, the method 200 may return to step (208) and continue to monitor the pressure and application rate. If the actual application rate deviates from the defined application range, at (220), the method 200 can include determining a second duty cycle based on a duty cycle error. The duty cycle error may be defined as the difference between the first duty cycle, which is causing the application rate to deviate from the defined application range, and the second duty cycle, which is predicted to return the application rate to return to the defined application range.

At (222), the method 200 can include determining whether the second duty cycle is greater than 100% duty cycle. If the second duty cycle is greater than 100%, at (224), the method 200 can include generating an output. In various examples, the output may be in the form of instructions for a change in one or more components of the work vehicle, such as the powertrain control system, and/or a notification provided to the user interface or electronic device.

If the second duty cycle is less than 100%, at (226), the method can include changing the duty cycle to the second duty cycle. Once the duty cycle is changed to the second duty cycle, the method 200 may return to (208) and repeat for a subsequent monitoring cycle.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for an agricultural application operation, the method comprising:
   receiving, through an input device, a target application condition for an agricultural product to be exhausted from a nozzle assembly;
   receiving, from a sensing system, an agricultural product flow condition and data related to boom movement of a boom arm in a fore direction or an aft direction relative to a frame;
   receiving, from a computing system, a first duty cycle;
   determining, with the computing system, a deflection magnitude of the nozzle assembly from a default axis in the fore direction or the aft direction based on a distance of the nozzle assembly along the boom arm relative to the frame and a boom deflection model;
   determining, with the computing system, a detected application condition based on the agricultural product flow condition, the data related to the boom movement, and the first duty cycle; and
   generating, with the computing system, a duty cycle command based on a comparison of the target application condition to the detected application condition.

2. The method of claim 1, wherein the target application condition includes at least one of a target spray quality index, a target application rate range, or a target pressure range.

3. The method of claim 1, wherein the detected application condition deviates from the target application condition based on the boom movement.

4. The method of claim 1, wherein the duty cycle command is to maintain the first duty cycle when the detected application condition is within a defined range of the target application condition.

5. The method of claim 1, wherein the duty cycle command is a second duty cycle when the detected application condition deviates from a defined range of the target application condition.

6. The method of claim 5, further comprising:
   generating, with the computing system, a vehicle command if the second duty cycle is to be greater than 100% duty cycle for a valve of the nozzle assembly.

7. The method of claim 5, further comprising:
generating, with the computing system, a notification when the first duty cycle is different than the second duty cycle.

8. The method of claim 1, further comprising:
calculating, with the computing system, a spray quality index at least in part based on one or more of the detected application condition, airflow at each nozzle assembly, a nozzle tip size, which agricultural product is being applied, and inclement weather.

9. An agricultural system comprising:
a product application system including one or more nozzle assemblies;
a sensing system configured to capture data indicative of a condition of a spray operation;
an input device configured to receive a target application condition for an agricultural product to be exhausted from a nozzle assembly;
a position sensor operably coupled with a boom assembly operably supporting the one or more nozzle assemblies and configured to capture data indicative of a boom position relative to a default axis; and
a computing system communicatively coupled to the product application system, the sensing system, the position sensor, and the input device, the computing system being configured to:
receive an agricultural product flow condition and data related to boom movement of a boom arm in a fore direction or an aft direction relative to a frame from the sensing system;
receive a first duty cycle for the one or more nozzle assemblies;
determine a position of the one or more nozzle assemblies relative to the default axis in the fore direction or the aft direction based on a boom deflection model, the data from the position sensor, and a position of the nozzle assembly relative to the frame;
determine a detected application condition based on the agricultural product flow condition, the position of the one or more nozzle assemblies relative to the default axis, and the first duty cycle; and
generate a duty cycle command based on a comparison of the target application condition to the detected application condition.

10. The system of claim 9, further comprising:
a flow sensor operably coupled with the product application system and configured to capture data indicative of a flow condition within the product application system.

11. The system of claim 10, wherein the duty cycle command is a second duty cycle when the detected application condition deviates from a defined range of the target application condition.

12. The system of claim 11, wherein the computing system is further configured to:
generate a vehicle command if the second duty cycle is to be greater than 100% duty cycle for a valve of the nozzle assembly.

13. The system of claim 11, wherein the computing system is further configured to:
generate a notification when the first duty cycle is different than the second duty cycle.

14. The system of claim 10, wherein the computing system is further configured to:
calculate a spray quality index at least in part based on one or more of the detected application condition, airflow at each nozzle assembly, a nozzle tip size, which agricultural product is being applied, and inclement weather.

15. The system of claim 9, wherein each of the one or more nozzle assemblies each include a pulse-width modulated valve.

* * * * *